(12) United States Patent
Wu et al.

(10) Patent No.: US 11,490,763 B2
(45) Date of Patent: Nov. 8, 2022

(54) FULLY AUTOMATIC AND EFFICIENTLY ENERGY-SAVING BARBECUE GRILL

(71) Applicants: Jilong Wu, Corona, CA (US); Xianghua Zheng, Corona, CA (US)

(72) Inventors: Jilong Wu, Corona, CA (US); Xianghua Zheng, Corona, CA (US)

( * ) Notice: Subject to any disclaimer, the term of this patent is extended or adjusted under 35 U.S.C. 154(b) by 354 days.

(21) Appl. No.: 16/848,089

(22) Filed: Apr. 14, 2020

(65) Prior Publication Data

US 2021/0315419 A1 Oct. 14, 2021

(51) Int. Cl.
*A47J 37/07* (2006.01)
*F23N 1/02* (2006.01)

(52) U.S. Cl.
CPC ....... *A47J 37/0713* (2013.01); *A47J 37/0754* (2013.01); *F23N 1/027* (2013.01)

(58) Field of Classification Search
CPC .......................... A47J 37/041; A47J 37/0745
See application file for complete search history.

(56) References Cited

U.S. PATENT DOCUMENTS

| | | | |
|---|---|---|---|
| 3,169,470 A * | 2/1965 | Oatley | A47J 37/041 99/421 HH |
| 4,154,154 A * | 5/1979 | Vivian | A47J 37/041 99/419 |
| 4,788,905 A * | 12/1988 | Von Kohorn | A47J 37/0781 454/189 |
| 5,168,798 A * | 12/1992 | Kristofich | A47J 37/041 99/421 A |
| 5,715,744 A * | 2/1998 | Coutant | A47J 37/041 99/421 A |
| 5,720,217 A * | 2/1998 | Pappas | A47J 37/0682 426/523 |
| 6,810,792 B1* | 11/2004 | Knight | A47J 37/0704 99/450 |
| 6,837,151 B2* | 1/2005 | Chen | A47J 37/041 99/421 H |
| 8,122,817 B2* | 2/2012 | Nimerovskiy | A47J 37/041 99/421 H |
| 10,010,215 B2* | 7/2018 | Brown | A47J 37/04 |
| 2008/0141997 A1* | 6/2008 | Druin | F24C 14/02 126/39 BA |
| 2009/0188484 A1* | 7/2009 | Nevarez | F24C 3/085 126/39 H |

FOREIGN PATENT DOCUMENTS

| | | | |
|---|---|---|---|
| CN | 103168804 A | * | 6/2013 |
| CN | 203181881 U | * | 9/2013 |
| CN | 204026677 U | * | 12/2014 |

(Continued)

*Primary Examiner* — Jorge A Pereiro
(74) *Attorney, Agent, or Firm* — Tommy S F Wang; Wang IP Law Group, P.C.

(57) ABSTRACT

A fully automatic and efficiently energy-saving barbecue grill is disclosed. The barbecue grill comprises: a grill body, having side walls and a top plate thereon, wherein a grill space is formed inside and a smokeless heating pipe is arranged in the grill space; a gas control device, installed in the grill body, guiding fuel gas to burn in the grill space to heat the smokeless heating pipe; and an automatic grill device, installed in the grill body, rotating food periodically to get grilled by the heat from the smokeless heating pipe.

11 Claims, 7 Drawing Sheets

(56) References Cited

FOREIGN PATENT DOCUMENTS

| | | | | |
|---|---|---|---|---|
| CN | 105380534 A | * | 3/2016 | ............... A47J 37/06 |
| CN | 109416178 A | * | 3/2019 | ............ F23D 14/04 |
| CN | 208925986 U | * | 6/2019 | ............ A47J 37/041 |
| CN | 109965726 A | * | 7/2019 | |
| CN | 110279311 A | * | 9/2019 | ............... A47J 37/04 |
| JP | 2006029703 A | * | 2/2006 | |
| KR | 481772 Y1 | * | 11/2016 | ............... A47J 37/04 |
| KR | 1744439 B1 | * | 6/2017 | ............ A47J 37/042 |
| KR | 2018002896 U | * | 10/2018 | ............ A47J 37/041 |
| WO | WO-03034880 A1 | * | 5/2003 | ............ A47J 37/041 |
| WO | WO-2012108810 A1 | * | 8/2012 | ............ A47J 37/049 |

\* cited by examiner

FULLY AUTOMATIC AND EFFICIENTLY ENERGY-SAVING BARBECUE GRILL

FIELD OF THE INVENTION

The present invention relates to a barbecue grill. More particularly, the present invention relates to a fully automatic and efficiently energy-saving barbecue grill which generates no soot while grilling.

BACKGROUND OF THE INVENTION

Barbecue is very important for families and social activities. When a party begins, everyone around the grill smell the of food and look forward to eating the delicious food. It unites family and friendship and releases stress in daily life.

Traditionally, people prepare a barbecue grill with a wire grid to place meet and other ingredients. Charcoals are stacked below the wire grid and ignited to generate heat to get the meet grilled. During the whole processes, although the smell causes people's appetite, ingredients in the smell are not healthy for the people. Combustion efficiency of charcoal is not high so that more carbon emission is produced. When people are having fun, they inadvertently hurt the environment. On the other hand, when barbecue initiates, it needs someone to watch and cook food in case the food gets charred. Inevitably, the one must always turn the food to be grilled from time to time. It is a tiresome job.

In order to make barbecue efficiently energy-saving and save manpower, there are many prior arts providing different barbecue devices. For example, U.S. Pat. No. 9,476,587 discloses a gas burner for ovens or grills. The gas burner includes a mixing chamber, composed of a Venturi tube, adapted to create a mixture of gas-primary air, and an elongated chamber, situated downstream the Venturi tube, provided with several holes for such a fuel mixture outflow and the corresponding combustion. '587 can make grill device efficiently energy-saving by using gas and provides a good way to heat food, however, it still needs people to change the direction of the food toward the heat source.

Another example is shown in CN 103168804A. An automatic barbecue rack is disclosed. The barbecue rack includes a grill body, a first conveyor belt and a second conveyor belt on both long sides of the grill body, and a first turning wheel and a second turning wheel are provided on both short sides of the oven body. The turning wheels are connected to a power device. A few limiting devices symmetrically disposed above the first and second conveyor belts. The conveyor belts and limiting devices work to allow barbecued food to be turned continuously and heated uniformly. However, it cannot settle the problem of combustion efficiency. It is not an energy-saving invention for barbecue.

Therefore, a fully automatic and efficiently energy-saving device for barbecue is still desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

According to an aspect of the present invention, a fully automatic and efficiently energy-saving barbecue grill is disclosed to fulfill the requirements mentioned above. The barbecue grill comprises: a grill body, having side walls and a top plate thereon, wherein a grill space is formed inside and a smokeless heating pipe is installed in the grill space; a gas control device, installed in the grill body, guiding fuel gas to burn in the grill space to heat the smokeless heating pipe; and an automatic grill device, installed in the grill body, rotating food periodically to get grilled by the heat from the smokeless heating pipe.

Preferably, the gas control device may further comprise: a fuel gas inlet; a fuel gas switch, mounted on the top plate and connected to one end of the fuel gas inlet, switching to control fuel gas provisioned externally; and a fuel gas conduit, connected to the other end of the fuel gas inlet and the grill space, guiding fuel gas to the grill space.

Preferably, a lower partition board may be formed below the grill space and an oil-water container is removably installed upon the lower partition board to hold water and oil from the grilled food.

Preferably, the grill body may further comprise inner partition boards, each substantially parallel to one side wall, respectively, forming the grill space along with the lower partition board and an accommodating space is formed within the inner partition boards and the side walls to accommodate the fuel gas conduit.

Preferably, an inlet channel may be formed through a first inner partition board for guiding the fuel gas conduit from the accommodating space to the grill space.

Preferably, a speed-controlled fan may be mounted below the lower partition board, an air conduit is installed on the first inner partition board in the accommodating space and an air inlet is formed near the speed-controlled fan and connected to the air conduit so that when the speed-controlled fan is turned on, fresh air is sucked into the grill space to burn with the fuel gas through the air inlet and the air conduit.

Preferably, a first control knob may be installed on the top plate and connected to the speed-controlled fan, operating to change the speed of the speed-controlled fan for controlling volume of the fresh air per unit time into the grill space.

Preferably, the automatic grill device may further comprise: a plurality of grill sticks, each coaxially connected with a pinion, puncturing food for grilling; a grill stick holder, mounted on the top plate and above the grill space, forming a plurality of U-grooves on two sides, wherein each pair of U-grooves on each side is used to hold one grill stick; a rack frame, having rack holes linearly arranged for rotating the pinion of the grill stick when the grill stick is placed in a pair of U-grooves, capable of moving back and forth on the top plate; a synchronous motor, outputting power; and an actuation mechanism, connected to the rack frame and the synchronous motor, transferring the power from the synchronous motor to move the rack frame back and forth.

Preferably, the actuation mechanism may further comprise: an eccentric wheel, eccentrically connected to a shaft of the synchronous motor; a sliding connecting L-bar, having one end connected to the rack frame through a notch on the top plate; and a sliding board, rotatably fixed at a first end and formed a vertical angle at a second end. A central opening is formed in a central portion of the sliding board. Circumference of the eccentric wheel contacts the circumference of the central opening. A limiting hole is formed in the second end of the sliding board. The other end of the sliding connecting L-bar is extended into the limiting hole. When the synchronous motor operates, the eccentric wheel is rotated to push the sliding board to swing around the first end thereof so that the second end of the sliding board moves back and forth along with the sliding connecting L-bar.

Preferably, a portion of the sliding connecting L-bar may be covered by a protective cover to prevent the food residues from falling into the grill body through the notch on the top plate.

Preferably, a cooling motor with a cooling fan may be installed on one of the side walls, and a second control knob is installed on the top plate and electrically connecting to the synchronous motor so that the synchronous motor is controlled by turning the second control knob.

Preferably, a power interface may be installed on one of the side walls and electrically connected to the cooling motor and the synchronous motor to transmit power from an external power cable to the cooling motor and the synchronous motor.

Preferably, the barbecue grill may further comprise a heat insulation rack, fixed on the top plate and above the grill space, hanging grilled food for heat insulation. The heat insulation rack may have a rectangular frame on the top.

The gas control device in the present invention can utilize fuel gas for heat source. The speed-controlled fan can control combustion of air and fuel gas for different requirements of barbecue. It can make combustion more efficiently to achieve energy-saving. Meanwhile, with the help of automatic grill device, no one is needed to monitor food when it is under grilling. The food can be grilled evenly and automatically. The design of oil-water container help people to clean the barbecue grill easily.

DETAILED DESCRIPTION OF THE PREFERRED EMBODIMENTS

The present invention will now be described more specifically with reference to the following embodiments.

Figure 1:
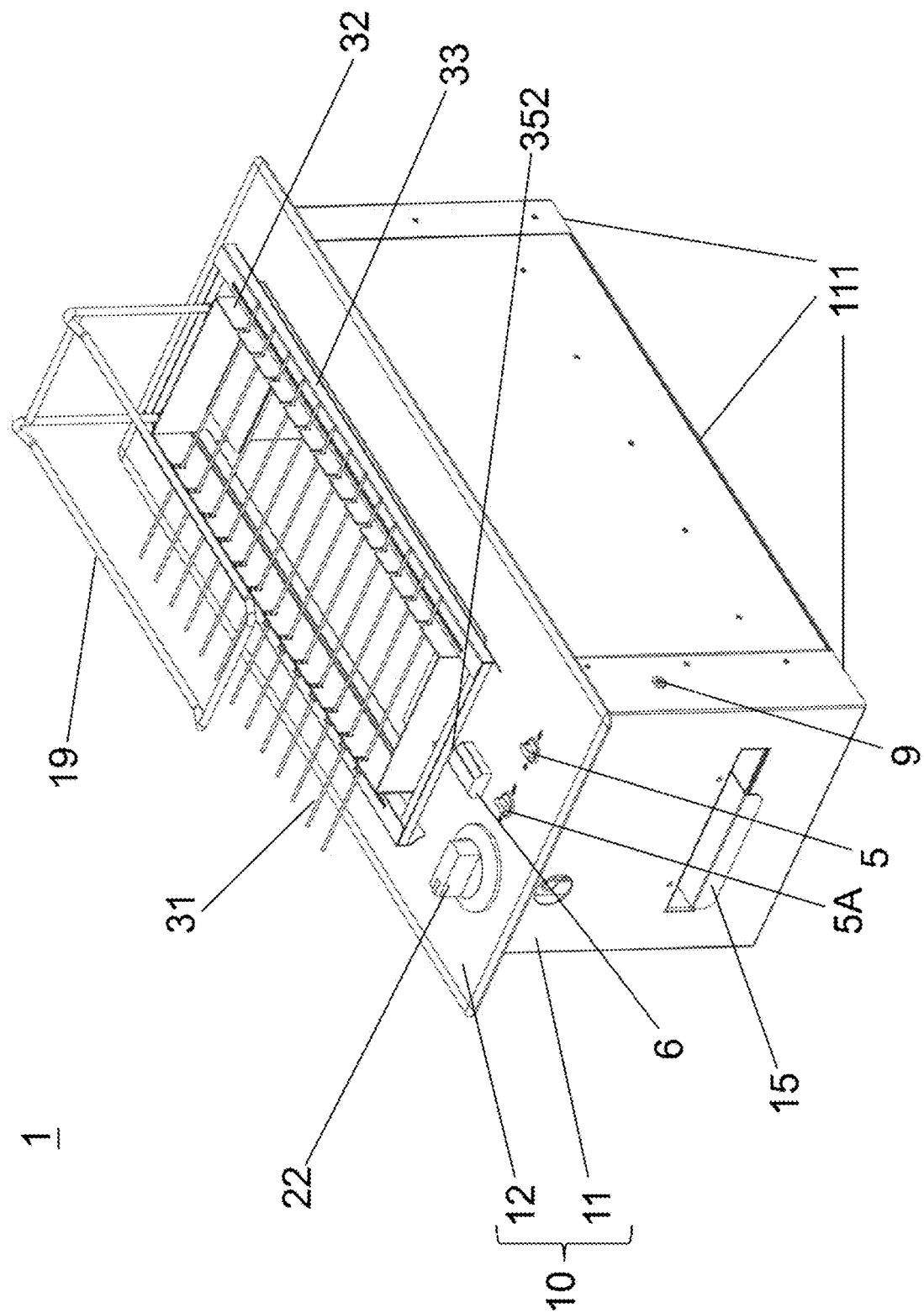
FIG. 1 is a schematic diagram of a fully automatic and efficiently energy-saving barbecue grill according to an embodiment of the present invention.
Figure 2:
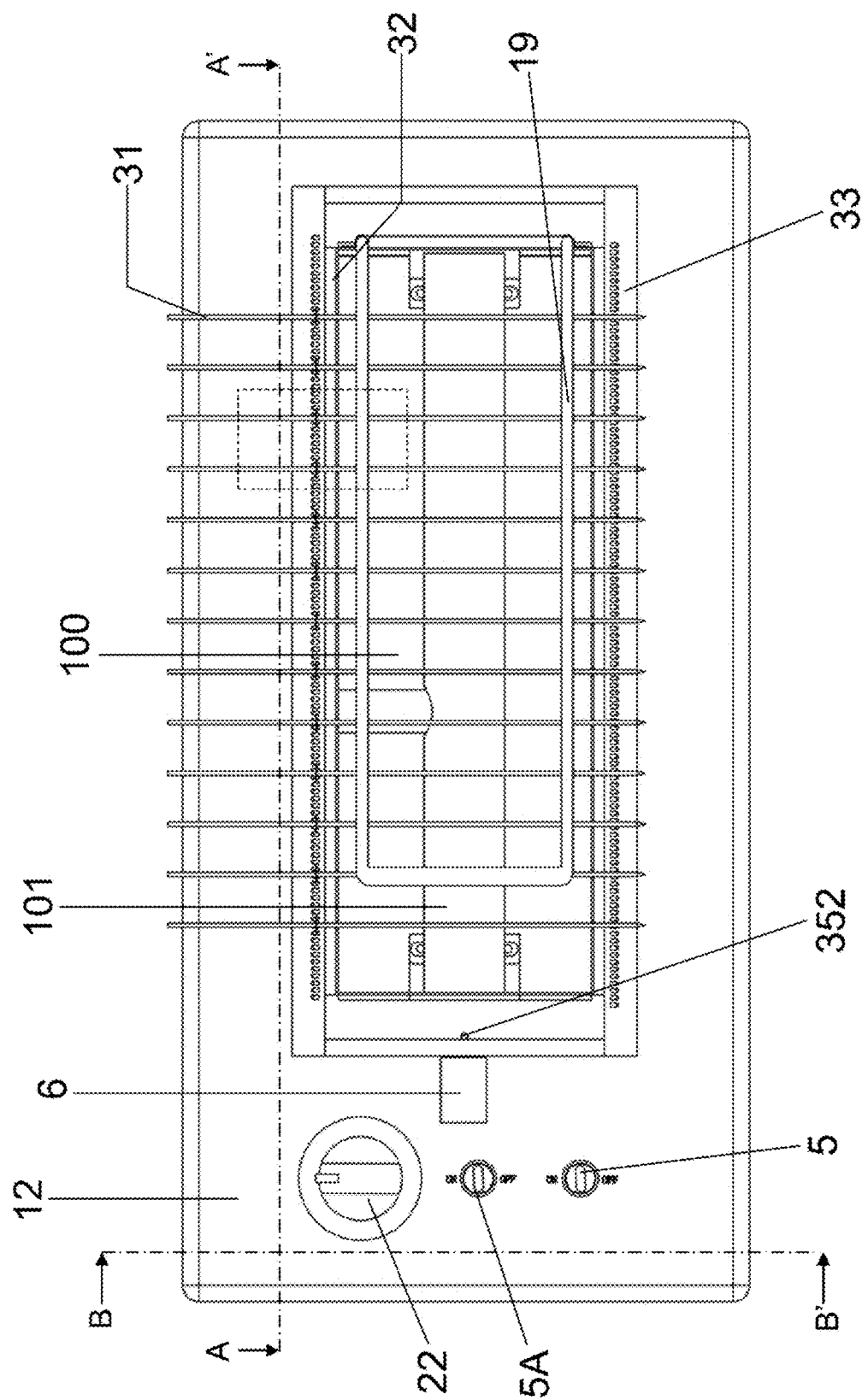
FIG. 2 is a top view of the barbecue grill.
Figure 3:
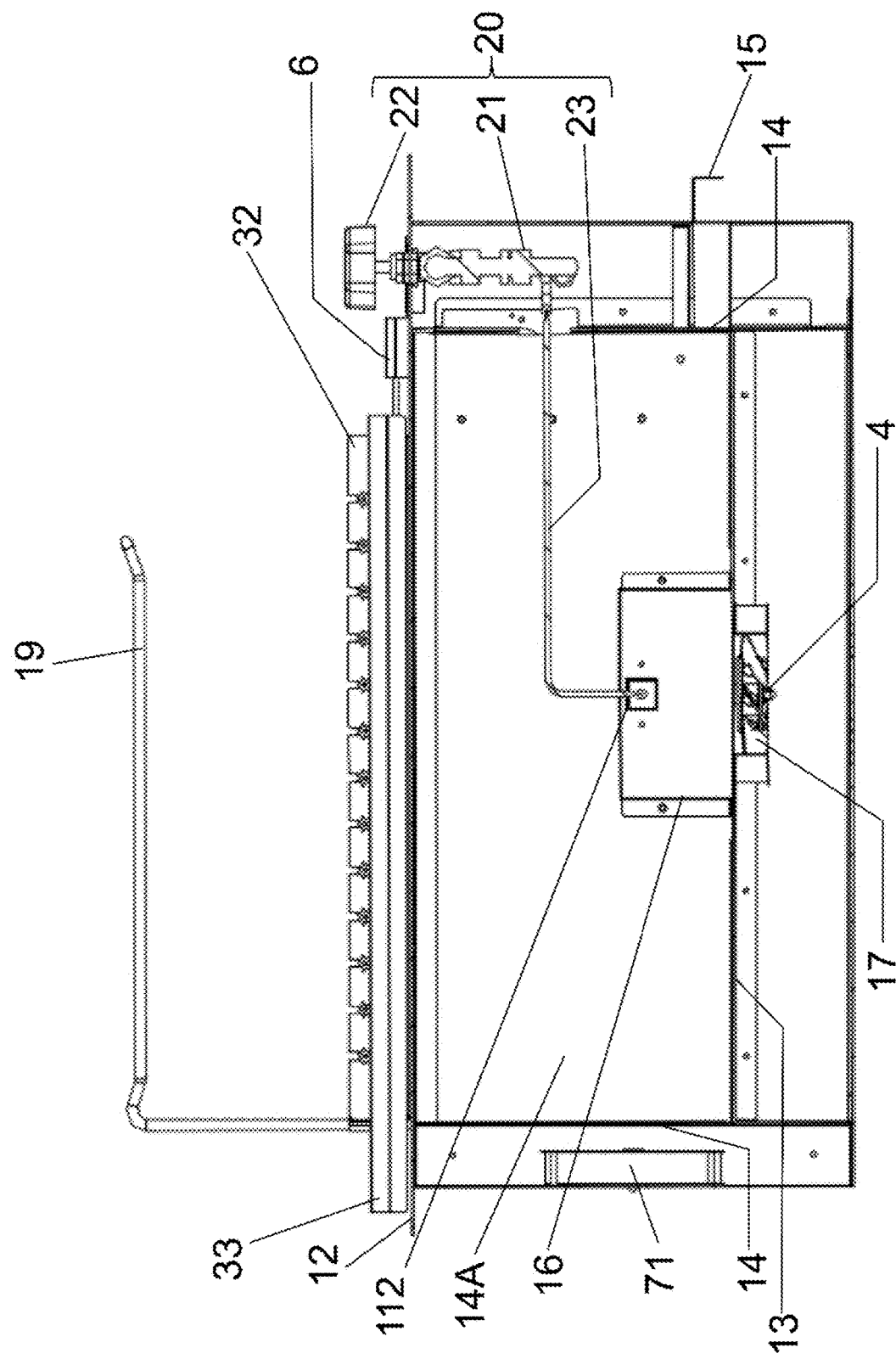
FIG. 3 is a cross-sectional view taken along the dash-dotted line AA' in FIG. 2 in the direction of the arrows.
Figure 4:
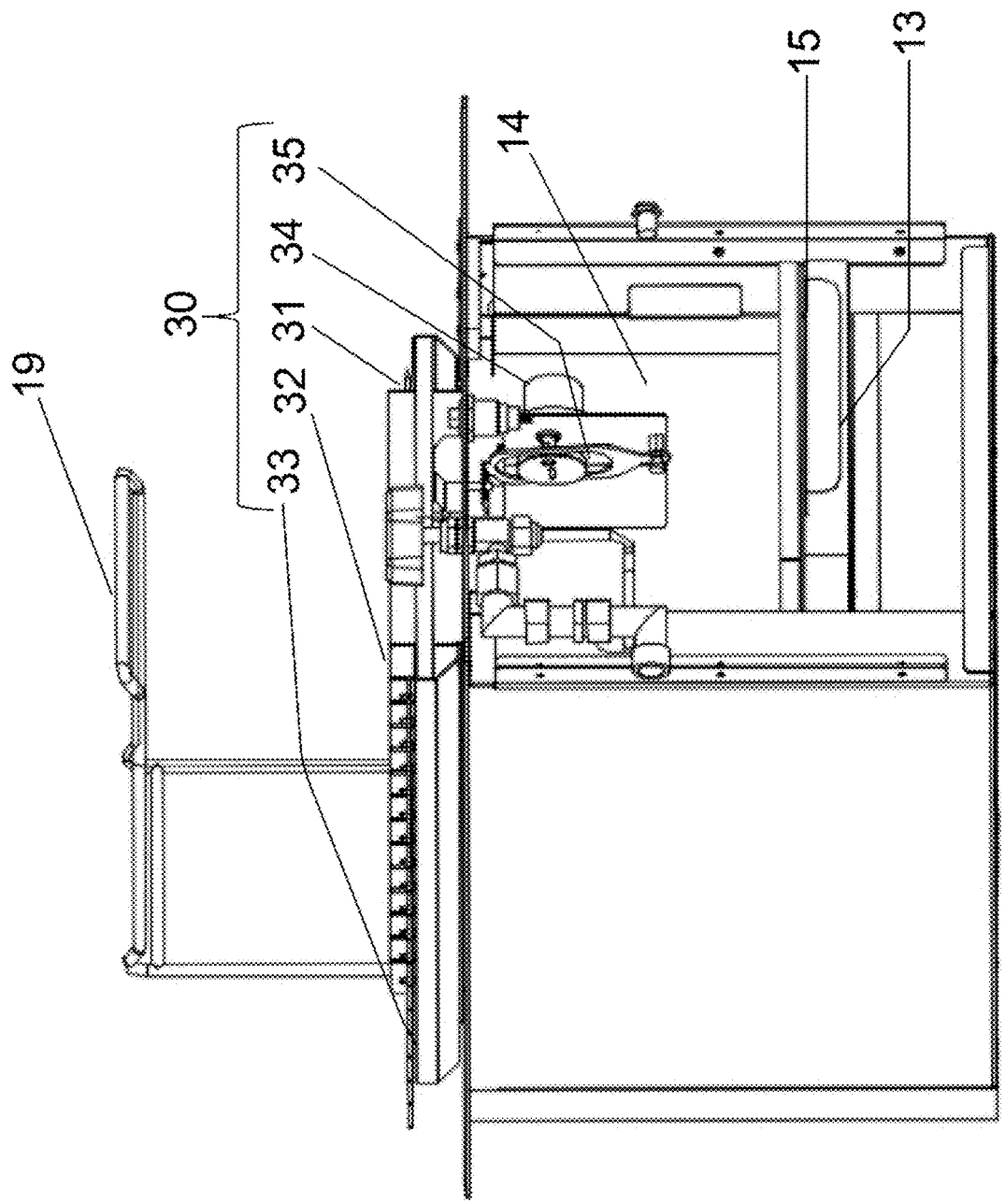
FIG. 4 is a cross-sectional view taken along the dash-dotted line BB' in FIG. 2 in the direction of the arrows with a rotation about 30 degrees.
Figure 5:
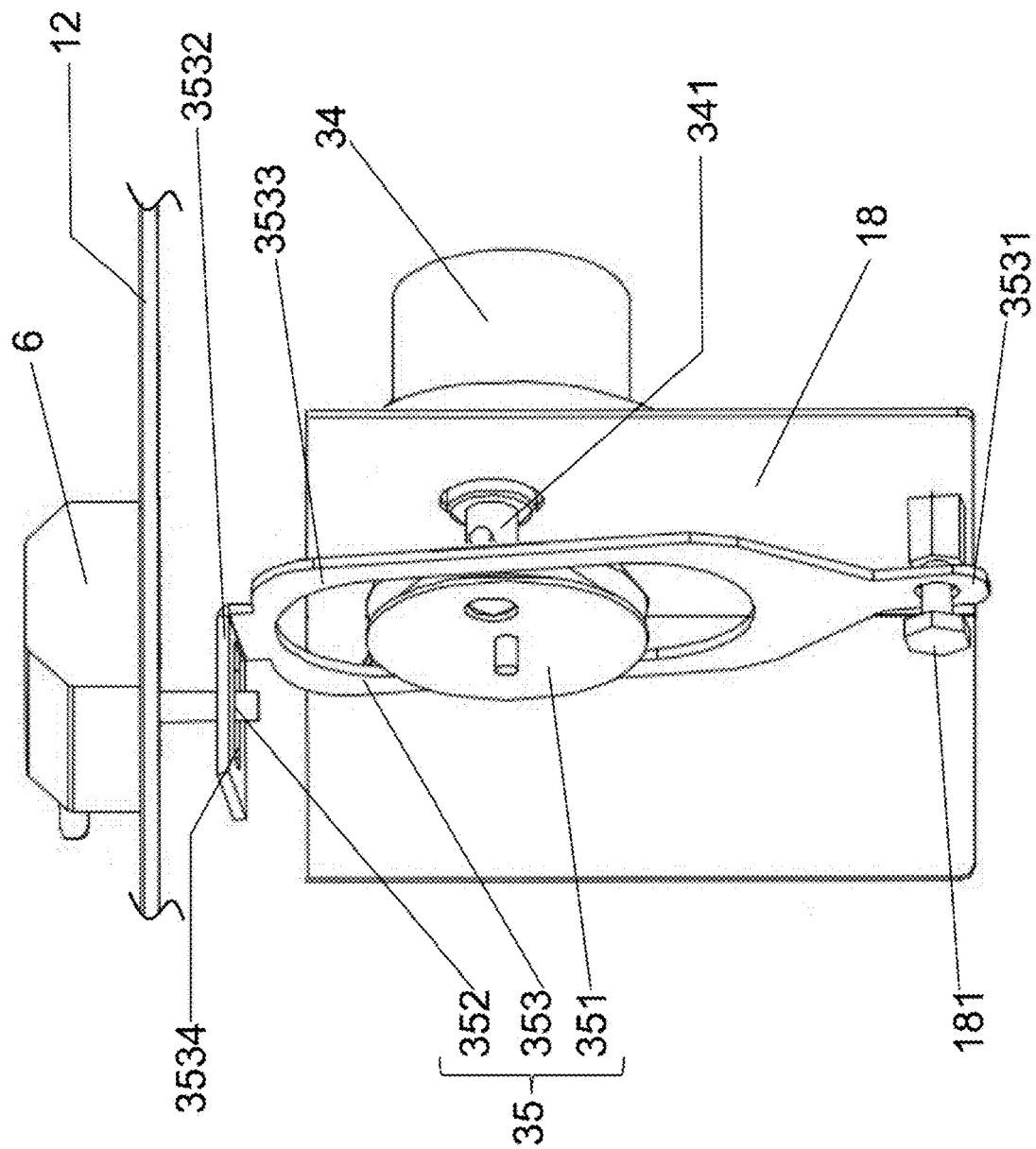
FIG. 5 is schematic diagram of a sliding board according to the embodiment of the present invention.
Figure 6:
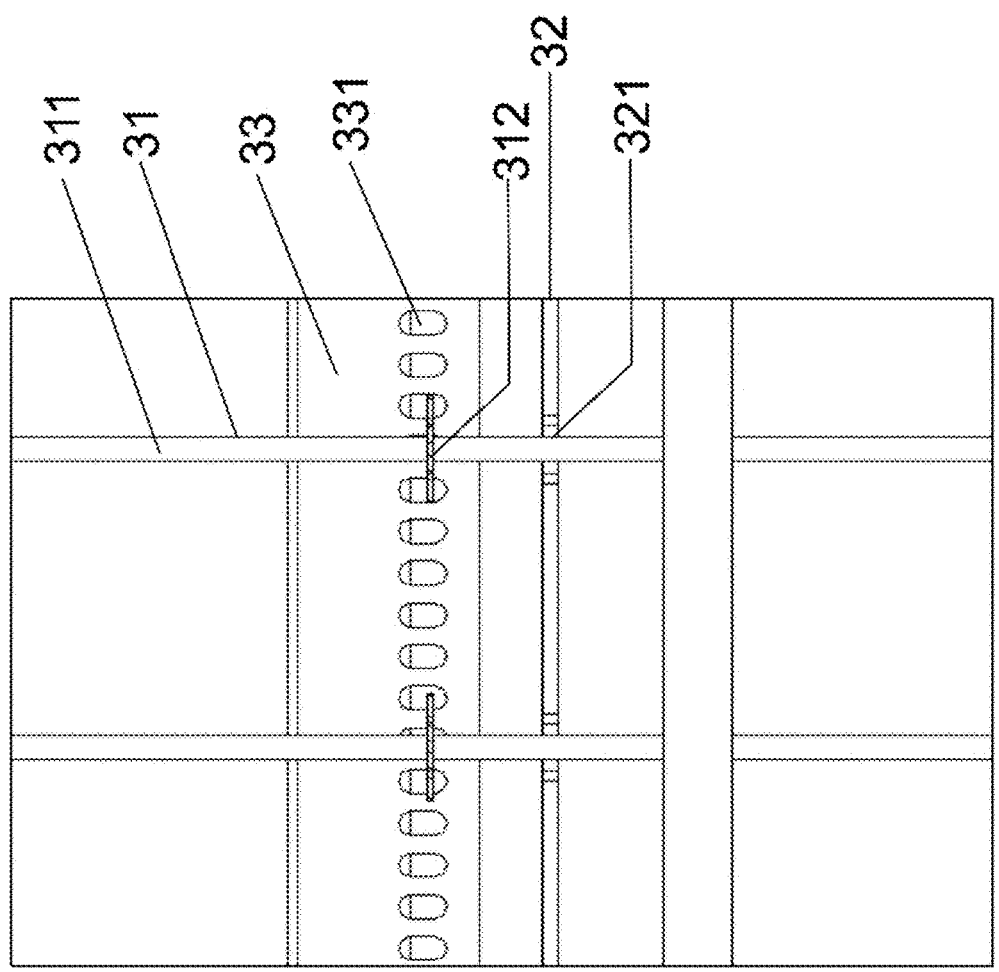
FIG. 6 is a view of an area enclosed by a dashed frame in FIG. 2.
Figure 7:
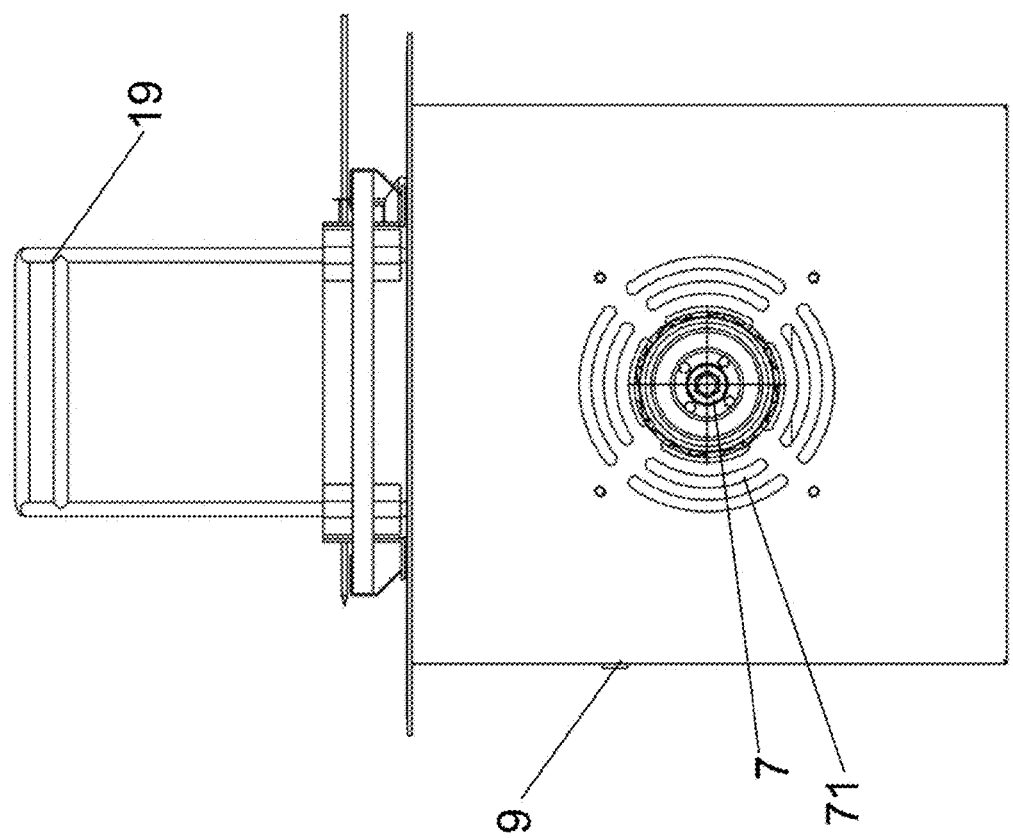
FIG. 7 is a side view of the barbecue grill.

Please refer to FIG. 1 to FIG. 7 with the description below. An embodiment of a fully automatic and efficiently energy-saving barbecue grill 1 according to the present invention is disclosed in FIG. 1. FIG. 2 is a top view of the barbecue grill 1. FIG. 3 is a cross-sectional view taken along a dash-dotted line AA' in FIG. 2 in the direction of the arrows. FIG. 4 is a cross-sectional view taken along a dash-dotted line BB' in FIG. 2 in the direction of the arrows with a rotation about 30 degrees. FIG. 5 is schematic diagram of a sliding board according to the embodiment of the present invention. FIG. 6 is a view of an area enclosed by a dashed frame in FIG. 2. FIG. 7 is a side view of the barbecue grill 1.

The barbecue grill 1 includes a grill body 10, a gas control device 20 and an automatic grill device 30. The grill body 10 has side walls 11 and a top plate 12 on the side walls 11. In this embodiment, the top view from FIG. 2 is rectangle. Thus, the grill body 10 has 4 side walls. In other embodiments, the top view may be other shapes, e.g. an oval, a circle, a triangle, a hexagon, etc. It means the number of side walls may change depending on the design of the grill body 10. For example, one-piece side wall may be used in an oval shape grill body 10. Basically, one side wall 11 forms one side of the grill body 10. However, the side wall 11 may be a combination of several parallel "boards 111" as shown in FIG. 1. As long as the structure of the parallel boards 111 is used to support the top plate 12, it is deemed as the side wall 11. The top plate 12 is used for barbecue operation and installation for many elements. Material of the side walls 11 and the top plate 12 may be stainless steel since it is antirust and easy to clean.

Please see FIG. 2. Not the whole space inside the grill body 10 is used for combustion and heating. Only a grill space 100 formed inside the grill body 10 takes the job. Fuel and fresh air are mixed somewhere in the grill space 100 and burned to generate heat. A smokeless heating pipe 101 is installed in the grill space 100. The heat generated by burning will be transferred to the heating pipe 101 then emitted to grill food.

More details of the grill body 10 are described below. Please refer to FIG. 4. A lower partition board 13 is formed below the grill space 100. An oil-water container 15 is removably installed upon the lower partition board 13. When barbecue begins, water and oil in the grilled food are splashed out. Finally, they will move downward along the inner structure of grill body 10. The oil-water container 15 can hold water and oil from the grilled food at the lowest location. Since the oil-water container 15 can be withdrawn out of the grill body 10, it can be cleaned and reused.

The grill body 10 includes several inner partition boards 14. In the present embodiment, there are 4 inner partition boards 14. Each inner partition board 14 is substantially parallel to one side wall 11, respectively. The inner partition boards 14 form the grill space 100 along with the lower partition board 13. An accommodating space is formed within the inner partition boards 14 and the side walls 11 to accommodate some internal components and isolates the internal components from the hot temperature in the grill space 100. As to the materials used, stainless steel is preferred for the lower partition board 13, the inner partition boards 14 and the oil-water container 15. Of course, glass is a choice for the oil-water container 15.

The gas control device 20 is installed in the grill body 10. It works to guide fuel gas to burn in the grill space 100 to heat the smokeless heating pipe 101. The gas control device 20 includes a fuel gas inlet 21, a fuel gas switch 22 and a fuel gas conduit 23. The fuel gas switch 22 is mounted on the top plate 12 and connected to one end of the fuel gas inlet 21. The fuel gas switch 22 can be switched to control fuel gas provisioned externally (e.g. from a tube of an LNG container connected to the fuel gas switch 22). The fuel gas conduit 23 is connected to the other end of the fuel gas inlet 21 and the grill space 100. It is used to guide fuel gas from the fuel gas inlet 21 to the grill space 100. The fuel gas conduit 23 and the fuel gas inlet 21 are accommodated in the accommodating space.

In order to let the fuel gas conduit 23 connect to the grill space 100, an inlet channel 112 is formed through a first inner partition board 14A (not all the inner partition boards 14) for guiding the fuel gas conduit 23 from the accommodating space to the grill space 100. Meanwhile, a speed-controlled fan 4 is mounted below the lower partition board 13. An air conduit 16 is installed on the first inner partition board 14A in the accommodating space and an air inlet 17 is formed near the speed-controlled fan 4 and connected to the air conduit 16. Thus, when the speed-controlled fan 4 is turned on, fresh air is sucked into the grill space 100 to burn with the fuel gas through the air inlet 17 and the air conduit 16. Then, ignite the grill space 100 with an ignition gun can set a fire in the grill space 100. Heat generated is transferred to the smokeless heating pipe 101 to grill food above.

In order to control the combustion in the grill space 100, a first control knob 5 can be used. The first control knob 5 is installed on the top plate 12 and connected to the speed-controlled fan 4. It operates to change the speed of the speed-controlled fan 4 for controlling volume of the fresh air per unit time into the grill space 100. If the volume of the fresh air per unit time is large, the combustion in the grill space 100 is more violent and more heat is generated. If the volume of the fresh air per unit time is small, the combustion in the grill space 100 is mild and less heat is generated. In other embodiment, the first control knob 5 can control the speed-controlled fan 4 to be two stages, "on" and "off", only.

The automatic grill device 30 is installed in the grill body 10. It can rotate food periodically to get grilled by the heat from the smokeless heating pipe 101. Please refer to FIG. 2 to FIG. 4. The automatic grill device 30 includes a number of grill sticks 31, a grill stick holder 32, a rack frame 33, a synchronous motor 34 and an actuation mechanism 35.

Please see FIG. 6. The grill stick 31 is a specially designed stick. It has a stick body 311. One end of the stick body 311 is sharp to puncture food for grilling while the other end is blunt. The grill stick 31 is coaxially connected with a pinion 312. The pinion 312 is located one third of the stick body 311 from the blunt end. The grill stick holder 32 is mounted on the top plate 12 and above the grill space 100. A number of U-grooves 321 are formed on two sides of the grill stick holder 32. Each pair of U-grooves 321 on each side is used to hold one grill stick 31. The grill stick 31 can rotate in the pair of U-grooves 321 but can not move out of the U-grooves 321. When the grill stick 31 rotates, the food it takes also rotates. The rack frame 33 has rack holes 331 linearly arranged for rotating the pinion 312 of the grill stick 31 when the grill stick 31 is placed in a pair of U-grooves 321. It can move back and forth on the top plate 12. In FIG. 2 and FIG. 6, the rack frame 33 can move from left to right and from right to left, causing the grill stick 31 to rotate counterclockwise and clockwise, alternately. The grilled food can be heated evenly by this way.

The synchronous motor 34 outputs power to move the rack frame 33. However, the actuation mechanism 35 is the one to turn the rotation power from the synchronous motor 34 into kinetic energy of the rack frame 33. To have a better understanding about the actuation mechanism 35 and how it works, please refer to FIG. 5. The actuation mechanism 35 is connected to the rack frame 33 and the synchronous motor 34, transferring the power from the synchronous motor 34 to move the rack frame 33. It has an eccentric wheel 351, a sliding connecting L-bar 352 and a sliding board 353. The eccentric wheel 351 is eccentrically connected to a shaft 341 of the synchronous motor 34. Thus, where the shaft 341 is connected to the eccentric wheel 351 becomes a rotation center of the eccentric wheel 351. The sliding connecting L-bar 352 is a L-shape metal bar. It has one end connected to the rack frame 33 through a notch on the top plate 12 and the other end connected to the rack frame 33. The sliding board 353 is rotatably fixed at a first end 3531 to a fixing board 18 mounted to the top plate 12 by a copper stud 181 and formed a vertical angle at a second end 3532. A central opening 3533 is formed in a central portion of the sliding board 353. Circumference of the eccentric wheel 351 contacts the circumference of the central opening 3533. A limiting hole 3534 is formed in the second end 3532 of the sliding board 353. The other end of the sliding connecting L-bar 352 is extended into the limiting hole 3534. When the synchronous motor 34 operates, the eccentric wheel 351 is rotated to push the sliding board 353 to swing around the first end 3531 so that the second end 3532 of the sliding board 353 moves back and forth along with the sliding connecting L-bar 352. Thus, the rack frame 33 is pushed by the sliding connecting L-bar 352 and moves back and forth on the top plate 12. Preferably, the automatic grill device 30 except the synchronous motor 34 and the are made of stainless steel.

According to the presentation, a portion of the sliding connecting L-bar 352 can be covered by a protective cover 6 to prevent the food residues from falling into the grill body 10 through the notch on the top plate 12. If the food residues fall into the grill body 10, it may cause damages to the synchronous motor 34 and the actuation mechanism 35.

A cooling motor 7 with a cooling fan 71 are installed on one of the side walls, as shown in FIG. 7. A second control knob 5A is installed on the top plate 12 and electrically connecting to the synchronous motor 34 so that the synchronous motor 34 can be controlled by turning the second control knob 5A, so that the synchronous motor 34 can be on or off as the second control knob 5A is turned to different positions.

A power interface 9 is installed on one of the side walls 11 and electrically connected to the cooling motor 7 and the synchronous motor 34 to transmit power from an external power cable (not shown) to the cooling motor 7 and the synchronous motor 34. Details of the electric circuit design therebetween is not mentioned here since it is a common knowledge in the field of the present invention.

Preferable, the barbecue grill 1 may comprise a heat insulation rack 19. It is fixed on the top plate 12 and above the grill space 100. It is used to hang grilled food for heat insulation. The heat insulation rack 19 may have any desired shape. In this embodiment, it has a rectangular frame on the top. The heat insulation rack 19 can be made by stainless steel bar.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A fully automatic and efficiently energy-saving barbecue grill, comprising:
   a grill body, having side walls and a top plate thereon, wherein a grill space is formed inside and a smokeless heating pipe is installed in the grill space;
   a gas control device, installed in the grill body, guiding fuel gas to burn in the grill space to heat the smokeless heating pipe; and
   an automatic grill device, installed in the grill body, rotating food periodically to get grilled by the heat from the smokeless heating pipe, wherein the automatic grill device comprises:
   a plurality of grill sticks, each coaxially connected with a pinion, puncturing food for grilling;
   a grill stick holder, mounted on the top plate and above the grill space, forming a plurality of U-grooves on two sides, wherein each pair of U-grooves on each side is used to hold one grill stick;
a rack frame, having rack holes linearly arranged for rotating the pinion of the grill stick when the grill stick is placed in a pair of U-grooves, capable of moving back and forth on the top plate;
a synchronous motor, outputting power; and
an actuation mechanism, connected to the rack frame and the synchronous motor, transferring the power from the synchronous motor to move the rack frame back and forth, wherein the actuation mechanism comprises:
an eccentric wheel, eccentrically connected to a shaft of the synchronous motor:
a sliding connecting L-bar, having one end connected to the rack frame through a notch on the top plate, and
a sliding board, rotatably fixed at a first end and formed a vertical angle at a second end,
wherein a central opening is formed in a central portion of the sliding board, circumference of the eccentric wheel contacts the circumference of the central opening, a limiting hole is formed in the second end of the sliding board, the other end of the sliding connecting L-bar is extended into the limiting hole, and when the synchronous motor operates, the eccentric wheel is rotated to push the sliding board to swing around the first end thereof so that the second end of the sliding board moves back and forth along with the sliding connecting L-bar,
wherein a portion of the sliding connecting L-bar is covered by a protective cover to prevent the food residues from falling into the grill body through the notch on the top plate.

2. The fully automatic and efficiently energy-saving barbecue grill according to claim 1, wherein the gas control device further comprises:
a fuel gas inlet;
a fuel gas switch, mounted on the top plate and connected to one end of the fuel gas inlet, switching to control fuel gas provisioned externally; and
a fuel gas conduit, connected to the other end of the fuel gas inlet and the grill space, guiding fuel gas to the grill space.

3. The fully automatic and efficiently energy-saving barbecue grill according to claim 2, wherein a lower partition board is formed below the grill space and an oil-water container is removably installed upon the lower partition board to hold water and oil from the grilled food.

4. The fully automatic and efficiently energy-saving barbecue grill according to claim 3, wherein the grill body further comprises inner partition boards, each substantially parallel to one side wall, respectively, forming the grill space along with the lower partition board and an accommodating space is formed between the inner partition boards and the side walls to accommodate the fuel gas conduit.

5. The fully automatic and efficiently energy-saving barbecue grill according to claim 4, wherein an inlet channel is formed through a first inner partition board for guiding the fuel gas conduit from the accommodating space to the grill space.

6. The fully automatic and efficiently energy-saving barbecue grill according to claim 5, wherein a speed-controlled fan is mounted below the lower partition board, an air conduit is installed on the first inner partition board in the accommodating space and an air inlet is formed near the speed-controlled fan and connected to the air conduit so that when the speed-controlled fan is turned on, fresh air is sucked into the grill space to burn with the fuel gas through the air inlet and the air conduit.

7. The fully automatic and efficiently energy-saving barbecue grill according to claim 6, wherein a first control switch is installed on the top plate and connected to the speed-controlled fan, operating to change the speed of the speed-controlled fan for controlling volume of the fresh air per unit time into the grill space.

8. The fully automatic and efficiently energy-saving barbecue grill according to claim 1, wherein a cooling motor with a cooling fan are installed on one of the side walls, and a second control knob is installed on the top plate and electrically connecting to the synchronous motor so that the synchronous motor is controlled by turning the second control knob.

9. The fully automatic and efficiently energy-saving barbecue grill according to claim 8, wherein a power interface is installed on one of the side walls and electrically connected to the cooling motor and the synchronous motor to transmit power from an external power cable to the cooling motor and the synchronous motor.

10. The fully automatic and efficiently energy-saving barbecue grill according to claim 1, further comprising a heat insulation rack, fixed on the top plate and above the grill space, hanging grilled food for heat insulation.

11. The fully automatic and efficiently energy-saving barbecue grill according to claim 10, wherein the heat insulation rack has a rectangular frame on the top.

* * * * *